Feb. 28, 1967  L. F. DASSE  3,306,401
BERYLLIUM CONTAINING FRICTION ELEMENT
Filed April 21, 1965  2 Sheets-Sheet 1
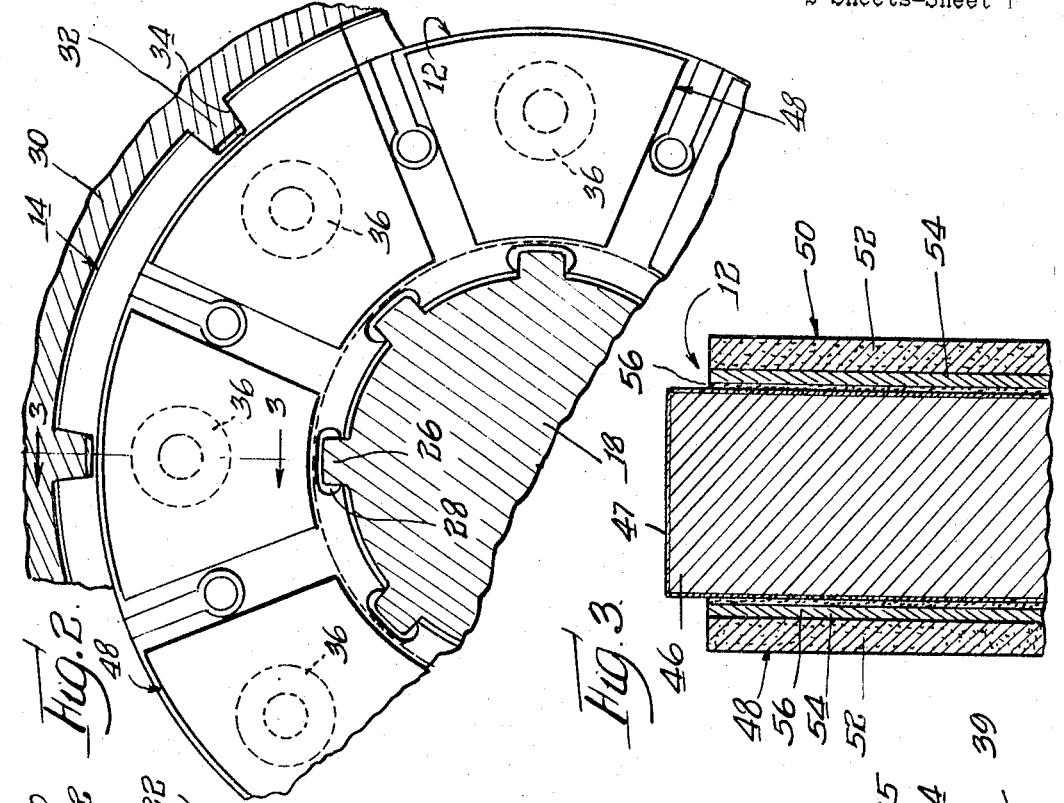
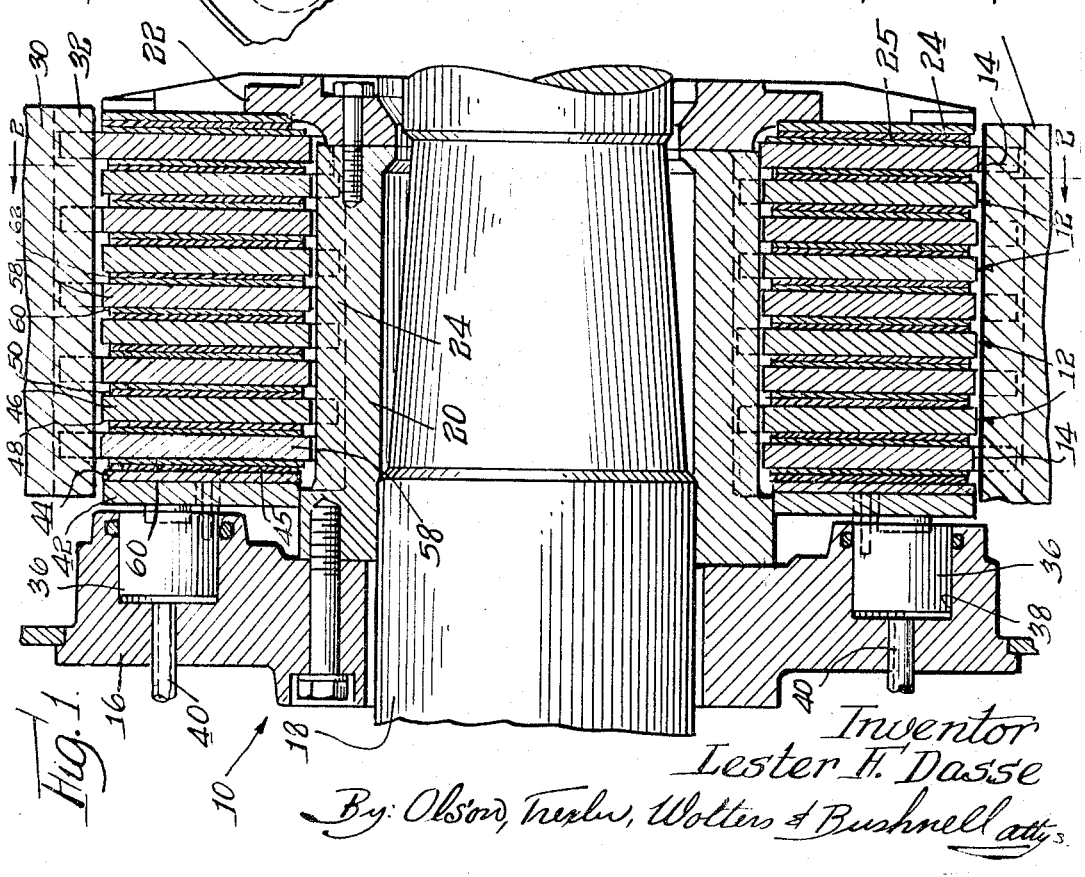
Inventor
Lester F. Dasse
By: Olson, Trexler, Wolters & Bushnell attys

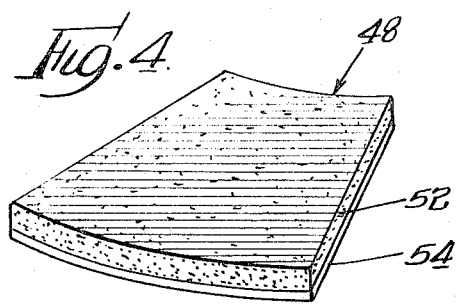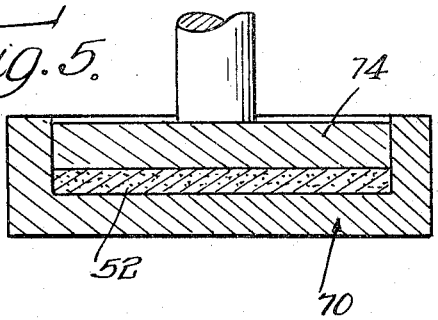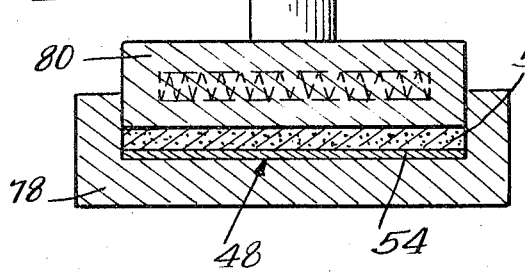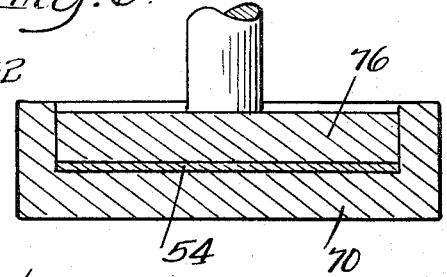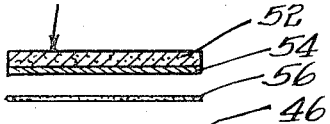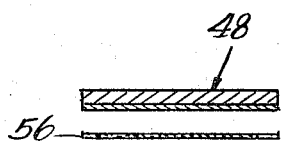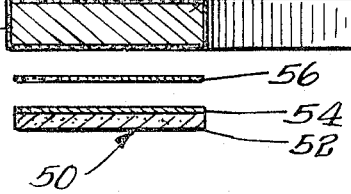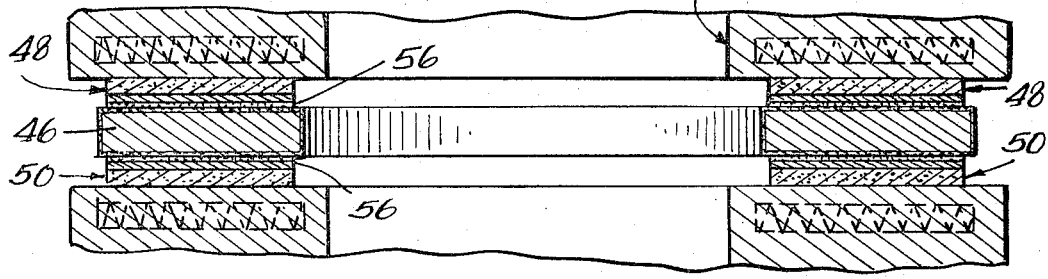

United States Patent Office 3,306,401
Patented Feb. 28, 1967

3,306,401
BERYLLIUM CONTAINING FRICTION ELEMENT
Lester F. Dasse, St. Joseph, Mich., assignor, by mesne assignments, to Lambert Brake Corporation, St. Joseph, Mich., a corporation of Michigan
Filed Apr. 21, 1965, Ser. No. 449,782
9 Claims. (Cl. 188—251)

The present invention relates to a novel friction mechanism, and more specifically to a novel brake structure and method of making the same.

While it will become apparent that certain features of the present invention may be utilized in various friction mechanisms such as brakes or clutches in a variety of apparatus, a brake structure of the type disclosed herein for the purpose of illustrating one embodiment of the present invention is especially suitable for installation in aircraft.

As will be understood, it is highly desirable to reduce the overall weight of brake units as well as other parts of an aircraft and at the same time aircraft brakes must be capable of accommodating the heat created during braking operations and providing an effective and sustained braking action. In view of these considerations, attempts have been made to produce brake units having friction discs, shoes and the like made from a lightweight material such as beryllium having a high specific heat, but such prior proposals have encountered fabricating and performance difficulties and in certain instances have contemplated combining or encasing the beryllium with steel in a manner such as to minimize any weight saving to an extent such that the increased costs of utilizing the beryllium have not been justified.

It is an important object of the present invention to provide a novel friction or brake unit having a friction member which is relatively light in weight, has a relatively high heat capacitance, is capable of providing an efficient and sustained friction or braking action and may be easily manufactured or fabricated.

A more specific object of the present invention is to provide a novel friction member and method of making the same for a brake unit or the like, which friction member comprises a body of lightweight metal such as beryllium having a high specific heat and being capable of maintaining its strength at high temperatures, and an element of friction or brake lining material mounted to the body member.

A further specific object of the present invention is to provide a novel friction member for a brake unit or the like and method for making the same wherein an element of sintered friction or brake lining material is bonded to a body member of beryllium in a manner which enables the bonding operation to be accomplished without injury to the body member.

Other objects and advantages of the present invention will become apparent from the following description wherein:

FIG. 1 is a fragmentary sectional view showing a portion of a brake unit incorporating features of the present invention;

FIG. 2 is a fragmentary sectional view taken along line 2—2 in FIG. 1;

FIG. 3 is an enlarged fragmentary sectional view showing a portion of a friction member or disc incorporating features of the present invention in greater detail;

FIG. 4 is a perspective view showing a segment of friction material used in the friction member; and FIGS. 5 through 9 are simplified views showing successive steps in the method of fabricating a friction member or disc in accordance with features of the present invention.

Referring now more specifically to the drawings wherein like parts are designated by the same numerals throughout the various figures, a brake unit 10 incorporating features of the present invention comprises friction members or discs 12 and 14 which are fabricated in accordance with a method described in detail below. In the embodiment shown, the brake unit comprises a plurality of each of the friction or disc members 12 and 14. The remainder of the brake unit may be fabricated in accordance with various known constructions and need not be described in detail.

For the purposes of the present disclosure, it suffices to state that the brake unit 10 includes a fixed end or power plate 16 suitably supported on an axle 18. A fixed tubular spacer 20 is secured to the end plate 16 and extends axially through the annular discs 12 and 14. An end plate 22 is fixed to the end of the tubular member 20 opposite from the power plate. A plurality of annularly arranged keystone shaped segments 24 covered with friction or lining material 25 are provided, which segments are made from a lightweight material such as beryllium and are riveted or otherwise secured to the plate 22 for cooperation with the friction disc pack.

The discs or friction members 12 are stator discs while the discs or friction members 14 are rotor discs. More specifically, in the embodiment shown, the fixed tubular member 20 is provided with axially extending ribs 26 engageable in notches 28 formed in the inner margins of the discs 12. The brake unit is adapted to be used in association with a wheel 30 having internal axially extending ribs or lugs 32 engageable in notches 34 formed in peripheral margins of the rotor discs or friction members 14.

In order to energize the brake structure, fluid pressure actuated pistons 36 are mounted in piston chambers 38, formed in and spaced around the power plate 16. Passageways 40 are provided communicating with the piston chambers 38, which passageways are adapted to be connected with a suitable source of fluid under pressure. As will be understood, the pistons may be hydraulically or pneumatically actuated and it is further contemplated that certain of the pistons may be hydraulically actuated while certain of the other pistons may selectively be pneumatically operated. Of course, any desired number of the pistons may be spaced around the power plate and in certain instances an annular piston completely encircling the power plate may be used.

A primary disc 42 is disposed between the pistons 36 and the pack of friction discs 12 and 14. Additional keystone shaped segments 44 covered with friction or brake lining material 45 are riveted or otherwise secured to the disc 42, which segments are also formed from a lightweight metal such as beryllium.

Each friction member or disc 12 comprises a central annular body member 46 formed from a lightweight metal having a high specific heat, a high heat conductance, and a high melting point and being capable of retaining its strength at high temperatures. More specifically, the body member 46 is formed from beryllium and is preferably protected against corrosion by anodizing or by electroplating a thin film 47 of silver or the like thereon, which film may have a thickness on the order of about .0002 to .0004 inch. The aforementioned notches 28 are formed in the inner margin of the body member 46. As shown best in FIGS. 2 and 3, segments of opposite sides of the body member 46 have elements or pads 48 and 50 bonded thereto in a manner described below.

The segments or elements 48 and 50 are identical and each comprises a laminated structure including a relatively thick outer or main body 52 formed from a sintered mixture of various metallic and non-metallic particles. The mixture of the body 52 may be of various known compositions and need not be described in detail. As is known, such mixtures may include iron or other metal particles, ceramic or non-metallic particles and graphite particles if desired, and the mixture is sintered under heat and pressure until the various powders have welded together into a relatively homogeneous material having sufficient strength.

Each of the elements or segments of lining material further comprises an inner layer 54 of metallic or iron particles only which are sintered at the same time as the body 52 so that the resulting element or segment is a laminate in which the iron or metallic layer 54 is effectively integrally joined to the composite body 52. The lining elements or segments 48 and 50 are bonded to the beryllium body by brazing or silver soldering in the manner described below so that a thin layer 56 of the brazing or soldering material is between the beryllium body 46 and the metallic or iron layer 54 of the laminated lining element. The layer 54 is relatively thin as compared with the thickness of the body 52. For example the layer 54 may have a thickness of about .020 inch and serves to provide a more readily bondable surface than would be presented by the lining 52 which may contain ingredients detrimental to a complete homogeneous bond with the brazing or soldering material.

The rotor members or discs 14 are essentially identical to the stator discs 12 except that they are provided with the aforementioned peripheral notches and are adapted for engagement with the wheel rather than the central tubular member 20. It is therefore unnecessary to describe the rotor discs 14 in detail and it suffices to state that each of these discs includes a central annular body 58 formed from beryllium or the same metal as the body member 46 and also coated for protection against corrosion, and elements or segments 60 and 62 of friction or lining material which are laminated and soldered or brazed to opposite sides of the body 58 in the same manner as the lining segments 48 and 50 of the discs 12.

Successive steps in the method of forming and fabricating a friction member or disc in accordance with features of the present invention are shown in FIGS. 5 through 9. More specifically, FIGS. 5 and 6 show initial steps in the formation of a friction element or segment during which a body 52 of the composite friction material and a thin body 54 of the metal particles are separately cold-pressed with molds 70 and 72 and cooperable plungers 74 and 76 into fragile green compacts. These green compacts are then assembled and sintered under heat and high pressure between mold 78 and plunger 80 as indicated in FIG. 7 until the various particles in the layers 52 and 54 have welded together and the layers are integrally joined with each other. This sintering operation is carried out under a vacuum or in the presence of an inert atmosphere and substantial pressures which may reach hundreds of p.s.i. and heat for a substantial length of time which may be about five to six hours in order to accomplish the desired welding.

The opposite faces or sides of the pre-sintered lining segments are ground to assure a flat parallel relationship. Then the ground segments are disposed in assembled relationship with a previously formed body or annular disc or beryllium which is coated for protection against corrosion and the brazing material is placed between the beryllium body and the lining segments as indicated in the exploded view of FIG. 8. The sides of the beryllium body are also ground to assume proper mating with the flat sides of the lining segments. One preferred procedure for forming the body 46 contemplates the use of beryllium powder which is hot-pressed and sintered into a form from which the body may be machined to provide a finished side or surface. In certain instances other processes and various alloys of beryllium may be used for forming the bodies 46 and 58. The bonding material may be provided in various known forms and is preferably provided as a thin foil of a high temperature silver solder having a thickness of about .005 inch to .007 inch. The assembly is then placed under heat and low pressure in a press 82 as indicated in FIG. 9 so that the solder material will form a combination of a dispersion and an inter-metallic alloy with both the beryllium core or body member and the metallic layer 54 of the lining segments and thereby provide a secure metallurgical bond between the parts.

It is noted that the pressures, times and temperatures required for the brazing or soldering operation are much less than those required for sintering the powdered materials of the lining segments. For example the pressure may be on the order of about 30 p.s.i. and heat may be applied for a short time which may be only a few seconds and is only sufficient to raise the temperature of the solder to its melting point. The melting point of the solder varies in accordance with the particular material used but is preferably high and on the order of about 1700° F. Tests have shown that when beryllium cores or body members are placed under pressures and temperatures for time sufficient to accomplish sintering of the lining materials, the cores are forged to an extent such that they require re-machining. In addition, such tests indicate that, under sintering conditions, the beryllium core material may be left with residual stresses which adversely affect the mechanical and functional properties of the core or body members leaving the body members more susceptible to cracking. On the other hand, it has been found that the pressures, temperatures and times required for the brazing operation which are much less than those for the sintering operation are such that there is no substantial detrimental effect to the beryllium cores.

While a preferred embodiment of the present invention has been shown and described herein, it is obvious that many details may be changed without departing from the spirit and scope of the appended claims.

The invention is claimed as follows:

1. A friction member for a friction device comprising a pre-sintered body of beryllium formed under predetermined high pressure and temperature for a predetermined length of time and having a subsequently finished surface, a lining element secured to said body surface, said lining element comprising a presintered laminate formed under predetermined high pressure and temperature for a predetermined length of time and including a pre-sintered outer layer of metallic and non-metallic lining material and a relatively thin pre-sintered inner layer of substantially only metallic material, and a bonding material melted and bonded under a pressure and for a time subsequently less than said predetermined sintering pressures and times between and joining said body and said inner layer.

2. A friction member, as defined in claim 1, wherein said outer layer comprises iron particles and said inner layer comprises substantially only iron particles, and said bonding material comprises metallic material.

3. A friction member for a friction device comprising a disc of relatively lightweight metal including beryllium having a high specific heat and a high melting point, said disc having a finished side a plurality of separate pre-sintered segments of lining material formed under a predetermined high pressure and temperature and for a predetermined length of time and spaced around and secured to said side of said disc, said segments respectively comprising a laminate including a pre-sintered outer layer of metallic and nonmetallic lining material and a pre-sintered inner layer of metallic material, and a metallic bonding material melted and bonded under a pressure and for a time substantially less than said sintering pressure and time between and joining said side of the disc and said inner layer of said segments.

4. A friction member as claimed in claim 3, wherein the inner layer is substantially iron and wherein the bonding material is substantially silver.

5. A friction member, as defined in claim 3, wherein said disc is formed in one piece of beryllium.

6. A friction disc member, as defined in claim 5, which includes a corrosion resisting coating on said beryllium disc.

7. In a friction brake structure, the combination comprising a plurality of axially aligned rotor and stator members, each of said members including a body of relatively lightweight metal including beryllium having a high specific heat and a high melting point, each of said bodies having a finished side and a lining element secured to said finished side of each of said rotor and stator members for frictional engagement with an exposed lining element of immediately adjacent rotor or stator member, each of said lining elements comprising a pre-sintered laminate formed under a predetermined pressure and temperature and for a predetermined length of time including a sintered outer layer of lining material and a sintered inner layer of substantially only metallic material, and metallic bonding material melted and bonded at a pressure and for a time substantially less than said predetermined pressure and time between and joining said inner layers of said lining elements and their respective associated bodies.

8. A brake structure as defined in claim 7, wherein said bodies of said rotor and stator members comprise annular discs of beryllium, and each of said rotor and stator members comprising a plurality of said lining elements spaced around said discs.

9. In a friction brake structure as claimed in claim 7, wherein the inner layer is substantially iron and wherein the bonding material is substantially silver.

References Cited by the Examiner
UNITED STATES PATENTS

| | | | |
|---|---|---|---|
| 2,359,361 | 10/1944 | Gleszer et al. | 192—107 X |
| 2,519,865 | 8/1950 | Wellman | 188—251 X |
| 3,179,209 | 4/1965 | Lucien et al. | 188—251 X |

FOREIGN PATENTS

| | | |
|---|---|---|
| 830,322 | 3/1960 | Great Britain. |

MILTON BUCHLER, *Primary Examiner.*

G. E. A. HALVOSA, *Assistant Examiner.*

UNITED STATES PATENT OFFICE
CERTIFICATE OF CORRECTION

Patent No. 3,306,401  February 28, 1967

Lester F. Dasse

It is hereby certified that error appears in the above numbered patent requiring correction and that the said Letters Patent should read as corrected below.

Column 3, line 67, for "assume" read -- assure --; column 4, line 50, for "subsequently" read -- substantially --.

Signed and sealed this 7th day of November 1967.

(SEAL)
Attest:

Edward M. Fletcher, Jr.

Attesting Officer

EDWARD J. BRENNER

Commissioner of Patents